United States Patent [19]

Carter et al.

[11] Patent Number: 4,588,864
[45] Date of Patent: May 13, 1986

[54] SMALL KEY TELEPHONE SYSTEM

[75] Inventors: Nicholas J. R. Carter; Douglas Sutherland, both of Shelton, Conn.

[73] Assignee: ITT Corporation, New York, N.Y.

[21] Appl. No.: 653,650

[22] Filed: Sep. 21, 1984

[51] Int. Cl.$^4$ .............................................. H04M 1/72
[52] U.S. Cl. ............................. 179/99 H; 179/84 SS; 179/99 P
[58] Field of Search ................ 179/81 R, 99 H, 99 A, 179/84 SS, 84 T, 84 L, 84 R, 81 B, 99 P

[56] References Cited

U.S. PATENT DOCUMENTS

| | | |
|---|---|---|
| 4,079,212 | 3/1978 | Sasai . |
| 4,088,846 | 5/1978 | McEowen ..................... 179/81 R X |
| 4,100,375 | 7/1978 | Noller ................. 179/99 H |
| 4,132,860 | 1/1979 | Rasmussen .................. 179/81 R X |
| 4,196,317 | 4/1980 | Bartelink ..................... 179/99 A |

Primary Examiner—James L. Dwyer
Attorney, Agent, or Firm—Peter C. Van Der Sluys; Robert A. Hays

[57] ABSTRACT

An intercommunication system makes use of existing quad wiring to provide intercom communication between the subsets of the system, as well as communication with a standard central office, or an "outside line". Each subset is provided with a control sequencer for selectively connecting the set to either an "intercom" or an "outside" or C.O. line. When the handset of a subset is lifted off the respective hookswitch, the subset is automatically connected to intercom line and signalling between subsets can occur with the outside line on "hold". The hold is released automatically when another handset is picked up.

Two indicators show activity on the two lines respectively.

22 Claims, 8 Drawing Figures

ICB = INTERCOM BUTTON ACTIVE
EXB = EXTERNAL BUTTON ACTIVE
HKSW = HOOK SWITCH ACTIVE

SMALL KEY TELEPHONE SYSTEM

BACKGROUND OF THE INVENTION

1. Field of the Invention

This invention relates to telephone systems and more particularly to intercommunicating systems which use existing single-line quadwire equipment for both intercom and normal telephone functions.

2. Description of the Prior Art

Many households presently have several telephone extensions distributed throughout the house connected to a single telephone line. The extension telephones enable a party to answer or initiate a call from any of the telephone locations. The convenience of an extension telephone is enhanced by the use of an intercom system which enables the answering party to call another person to the phone by "paging" that person over the intercom rather than by shouting aloud for that person.

Some home telephone adjuncts or intercom systems also provide a capability to allow the answering party to return the handset to the on-hook position and then pick up the call at another telephone location without dropping the call. Such a "hold" feature together with a "paging" capability are part of the prior intercom art. Additionally, some prior intercom art allows for signalling a busy intercom connection that an outside call is ringing (call waiting feature).

An intercom system to be used with a single-line installation must be economically justifiable, should not preclude use of the existing nonkey telephone subsets in the normal way, and also use the four-conductor telephone cable that is normally prewired in homes.

The problem with the prior art intercom systems which are used in conjunction with an existing single-line telephone system is that some intercoms require more than the standard four-conductor telephone cable to provide an intercom function. However installation of special wiring requires special skills and it is difficult and expensive to accomplish in existing structures.

The hold, paging, and call waiting features also are available in the commercial environment in the form of key telephone systems. These key systems, however, are not always practical or economical for single-line installations since they require key telephones, line circuits and additional wiring to provide the required functions. Such systems are not cost effective for less than 10 sets and they do not normally interface with existing non-key type subsets.

In the prior art U.S. Pat. No. 4,196,317 to Bartelink describes a relatively simple system in which manual switches are used to switch a given subset between a central office line and an intercom line. Intercom call signalling is accomplished by transmitting an audio signal on the intercom line, which must be interpreted by the users.

Use of central control electronics puts a financial burden on small system purchasers, and thus distributed control is preferred over centrally controlled systems. The following prior art patents disclose systems with central control electronics. U.S. Pat. No. 4,088,846 to McEowen discloses a system comprising subsets with adjuncts interconnected by two lines and a common control circuit. One line is used for voice control and supervisory signals. The second line is used to control and power the subset adjuncts.

U.S. Pat. No. 4,079,212 to Sasai shows another example of a system in which subsets are connected to a common control (or main) equipment by a first line for voice signals and a second line for control signals.

Finally, U.S. Pat. No. 4,100,375 to Noller shows a system in which each subset and device is wired in parallel to a control circuit.

OBJECTIVES AND SUMMARY OF THE INVENTION

A principal object of this invention is to provide a system which can make use of an existing quad cable, wired in a home or small business, interconnected to an outside line, which provides access to the outside line and allows intercommunication between the subsets.

Another objective is to provide voice paging to all the subsets of the system.

A further objective is to provide a flexible system with distributed control of two to eight or more subsets which can readily be added by merely connecting each set to the quad line.

Yet another objective is to provide a system which is compatible with existing subsets. These and other objectives and advantages are more clearly defined in the following description of the invention. According to the present invention an intercommunication system comprises a first outside line for communication with a central office, or PBX, a second intercom line for intercom communication, and a plurality of subsets connected to said lines. In addition to standard ringer, and dialer circuits, a handset and a hookswitch, each subset also comprises a first pushbutton for selecting the intercom line, a second pushbutton for selecting the outside line, a relay which connects the other elements of the subset selectively to either the intercom or outside line, and a sequencer which controls the relay in accordance with input signals received from the push-buttons and the hookswitch and also controls a circuit to keep the central office line on "hold".

The relay is set by the sequencer so that in stand-by mode it provides a connection to the central office line, however this relay switches over to the intercom line as soon as the respective handset is lifted. A paging means is also provided in each set comprising means for generating a paging control signal imposed on the intercom line and means for receiving audio paging signals enabled by said control signals. The audio paging signals are transmitted over the intercom line and may be generated from the handset of one of the subsets.

DESCRIPTION OF THE PREFERRED EMBODIMENT

Figure 1:
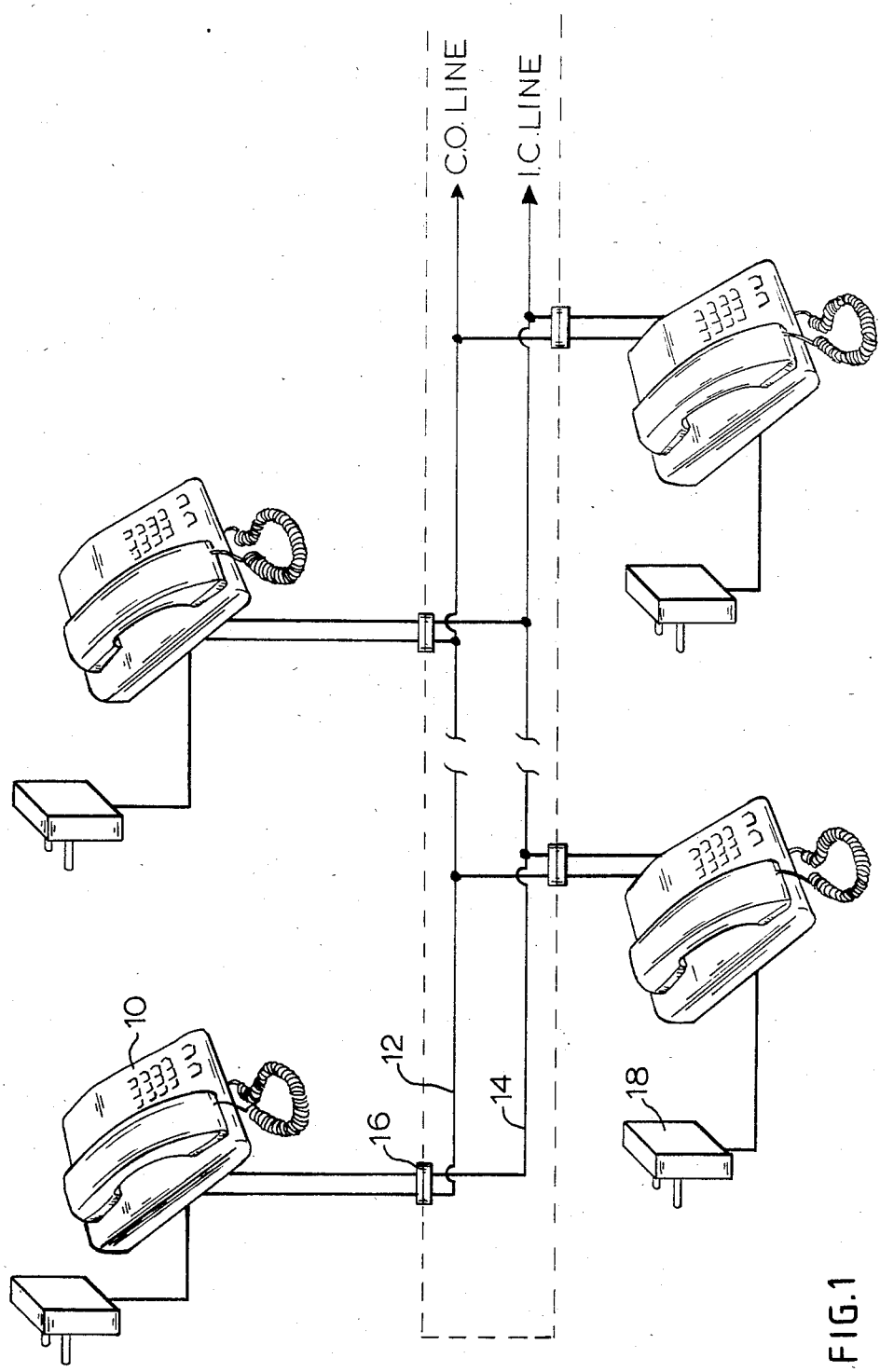
FIG. 1 is a somewhat schematic overview of the system.

As shown in FIG. 1 the system typically consists of two or more subsets 10 connected to a standard four wire, 2 pair system, one pair (the red and green wires) indicated as pair 12 is connected to central office or C.O. or an outside line, while the second pair 14 is normally idle. This second pair has been used in some older type phones to transmit low voltage AC power for lights in the subsets and is typically comprised of a yellow and black wire. The present invention may not be used in installations where the second pair is used to transmit low voltage AC power.

In the present system pair 12 shall be used in its old capacity as a connecting means to the outside line or the central office while the second pair 14 shall be used for intercommunication between the differents subsets. Subset 10 is connected to the wire pairs 12 and 14 through a typical modular connector 16. Wires comprising pair 12 shall be referred to as "tip" and "ring" in accordance with standard usage while the wires of the second pair 14 shall be referred to as the IT (intercom tip) and IR (intercom ring) wires. At least one subset is also connected through an adapter 18 to the regular 120 volt AC supply.

The elements of each subset shall now be described in conjunction with FIG. 2. Each subset is, as previously described, connected through a first pair of wires 12 to an outside line for communication with a central office or a PBX. A second pair of wires 14 is used strictly for intercom communication and paging. Each subset comprises a control and switching circuit 20 provided to switch the handset between the two pairs of wires. A deringer 22 is connected directly to pair 12 and may comprise a standard bell arrangement or an electronic tone ringer which produces an output to a speaker 24. This ringer is activated whenever an incoming ringing signal is received on pair 12. The control and switching element is also connected to dialer 26 which may be a standard rotary type dialer or, as is more usual with modern systems a tone dialer. A switch assembly 28 is also provided with appropriate switches for activating control functions. Preferably switch assembly 28 also comprises visual indicators for showing whether the set is being connected to the intercom wires 14 or the outside wires 12. Preferably the visual indicators comprise LED's or similar devices mounted in or physically associated with the push button switches; however, a separate indication assembly 29 could be used. Also connected to the control and switching element is an intercom signaling and paging means 30. The actual voice signals are passed between a standard handset 34 and the selected line pair via a standard telephone network in 32. The handset when removed or replaced controls a hook switch located in 32.

Figure 3:
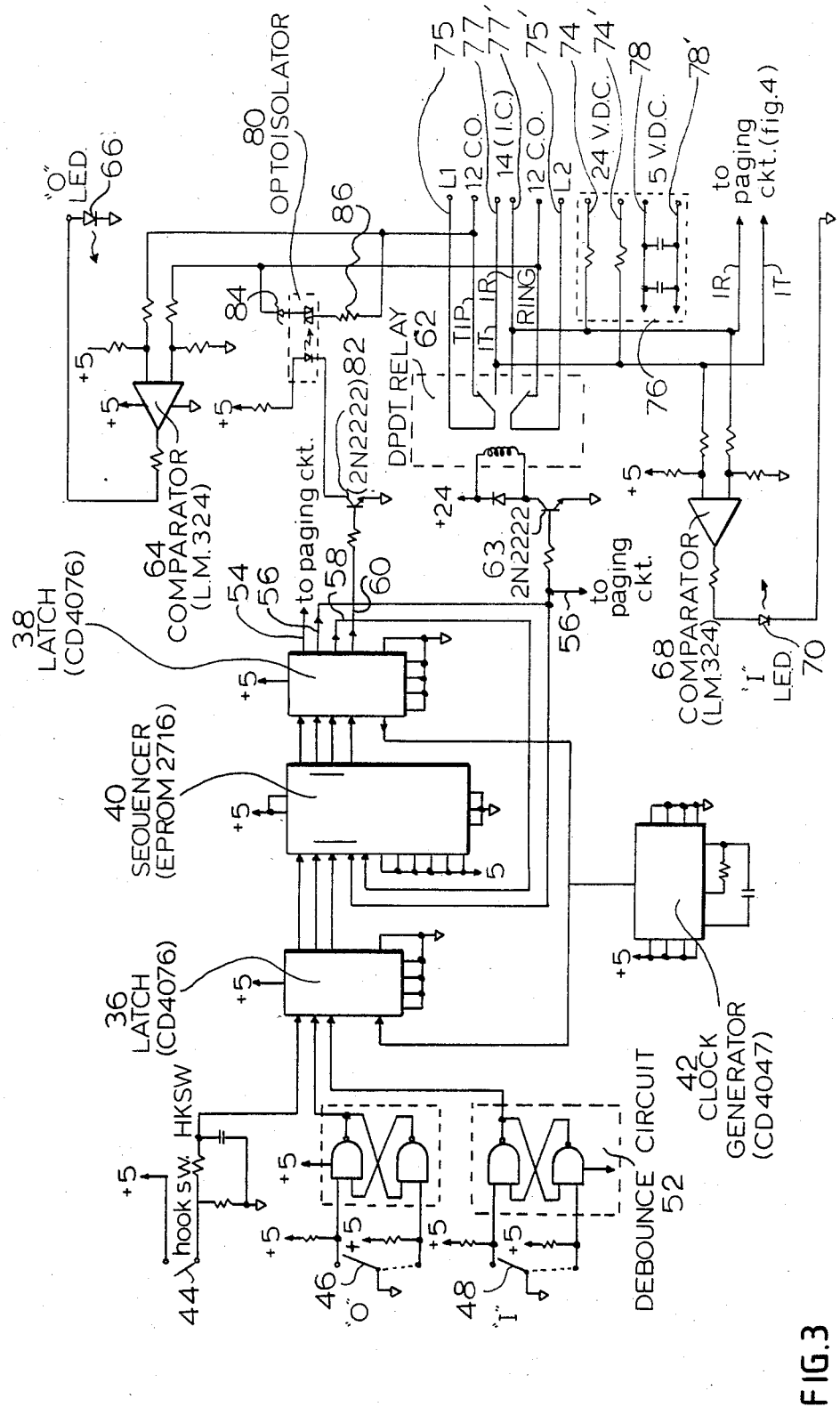
FIG. 3 shows the actual circuits of the preferred embodiment for the phone control.

The control and switching circuit is shown in FIG. 3. The heart of the circuit is a control sequencer 40 comprising a ROM. Two circuits 36 and 38 are used as latching means to latch the inputs and outputs of the sequencer 40 as shown. Each latching means 36, 38 comprises four flip-flops and may be an integrated circuit chip such as an RCA CD 4076. Alternatively the latching means 36 and 38 could be incorporated in a programable logic array along with the ROM. A CMOS clock generator 42 is used to provide the timing pulses to the flip-flops and the sequencer.

A microswitch 44 operatively connected to the hookswitch in 32 is used to monitor the physical position of said hookswitch. The microswitch is used to transmit the status of the hookswitch to the sequencer 40. The subset is also provided with two SPDT push buttons 46 and 48 which are part of the switch assembly 28. Each pushbutton 46, 48 is provided with a debouncing network (50, 52 respectively) comprising two NAND gates. The outputs of these debouncing networks are fed to the sequencer through latch 36.

Latch 38 has four outputs 54, 56, 58, 60. Output 54 is used to activate the paging circuit described in more detail below. Output 56 is connected to the paging circuit contained in the intercom signaling means 30. Output 56 is also fed back into the sequencer 40 and also activates a DPDT relay 62, through a transistor 63. The purpose of the relay is to connect lines L1, 75, and L2, 75', of the typical subset to either the outside (C.O.) lines 12 (i.e. the "tip" and "ring" lines) or to the intercom lines 14 (i.e. the IT and the IR lines) as shown. The lines L1 and L2 are then connected to the other elements of the typical subset i.e. dialer 26 and network and hookswitch contained in 32 (shown in FIG. 2) which perform their normal functions.

A first comparator 64 is connected across the TIP and RING wires 12 as shown to drive a first indicator 66. Indicator 66 is an LED or similar device and it is adapted to provide an appropriate visual indication of activity on the outside line pair 12. Physical indicator 66 is either part of assembly 28 or a separate indicator assembly 29 (FIG. 2).

A second comparator 68 is similarly connected to I.C. pair 14 and drives a second visual indicator 70 to indicate activity thereon.

Figure 2:
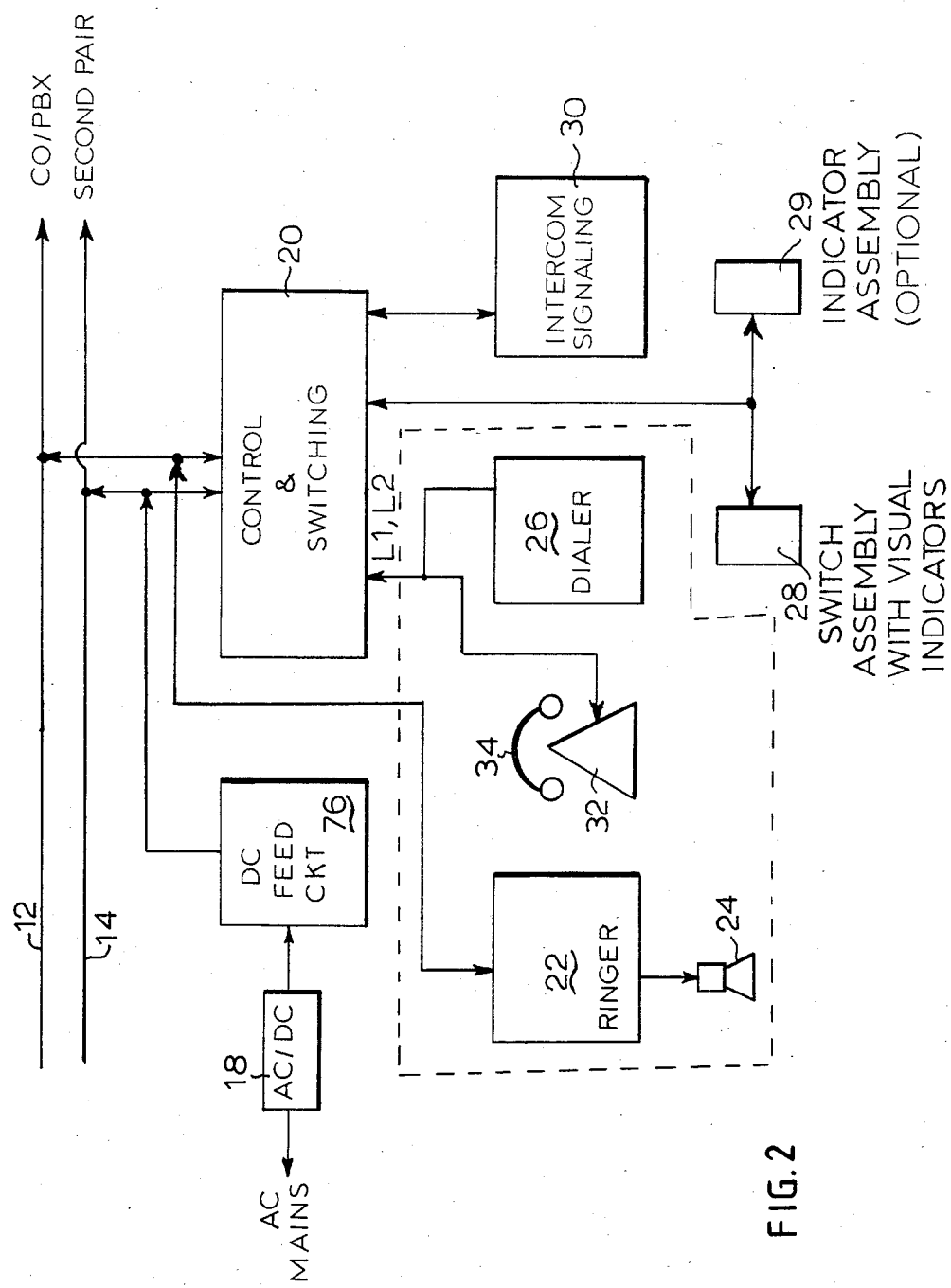
FIG. 2 shows the essential elements of each subset.

Since battery feed is required in each subset (as described below) the intercom wire pair 14 in at least one subset is also provided with 24 VDC voltage via terminals 74, 74' of DC Feed Circuit 76 derived from AC/DC power supply 18 (FIG. 2). A pair of 5 VDC voltage terminals 78, 78' is also provided to supply power to the logic elements of the circuit. The 5 VDC is also derived from the AC/DC power supply 18 (FIG. 2).

Output 58 of latch 38 is fed back to the sequencer 40.

Output 60 is used to activate an optical isolating element 80 through a transistor 82. The purpose of the optical isolator 80 is to connect a zener diode 84 and resistor 86 to simulate a "hold" condition on the outside line (C.O.) pair 12. The zener back-biasing voltage of diode 84 is selected to be between the open circuit battery feed voltage on the outside line pair 12 and the OFF HOOK voltage.

The circuit of FIG. 3 operates as follows. While the system is in standby mode L1 and L2 are connected to the outside line pair 12 and the hook switch is open. Any incoming ring signals on the outside line pair 12 activate the ringer 22 in each set. If the handset 34 is picked up (i.e. taken off hook) the hookswitch closes, microswitch 44 is activated and the subset is automatically put into an intercom mode by the sequencer 40. Sequencer 40 activates relay 62 which connects lines L1, 75 and L2, 75', to the intercom pair 14 comprising lines 77 and 77'. This activation of relay 62 occurs fast enough so that the outside line pair 12 does not sense the activation of the hookswitch in 32 and the ring signal is continued. The person may access the outside line pair 12 by pushing the "0" pushbutton 46. This step flips the relay connecting lines L1 and L2 to the outside line pair 12.

If an incoming call is answered and must be transferred to another subset, the first subset is put into the intercom mode by activating the "I" pushbutton 48 allowing paging between the subsets. In response to the activation of pushbutton 48 the relay 62 changes state again and the hold circuit is activated.

Each subset has the ability to place an outside call on hold. This feature may be used independently or in conjunction with the use of the intercom as described previously. If an outside call is in progress, pushing the intercom button "I" will place the outside line on hold and switch the subset to the intercom line. An intercom call can then be conducted or the phone can be hung up. The outside line will be held until one of the subsets once again accesses the outside line. Taking any type of subset off hook will release the hold function, the subset need not be constructed in accordance with this invention.

The two indication means 66 and 70 give a visual indication of the system status. If the intercom line is in use, the intercom LED 70 will light on all subsets. If the outside line is in use, or on hold, the outside line LED 68 will light on all subsets.

The comparators 64 and 68 operate as follows. The outside line (i.e. pair 12) is connected to a central office or PBX battery (not shown) and the voltage across terminals 75, 75' (FIG. 3) is approximately equal to said battery voltage when not connected to a subset. When the respective subset is connected to pair 12 by relay 62 and the hookswitch, the voltage across terminals 75, 75' drops activating comparator 64. Similarly in standby mode the voltage across terminals 77, 77' of pair 14 is substantially 24 VDC, the drop across resistors 74, 74' being negligible. When relay 62 and the hookswitch connect the subset to I.C. pair 14, the voltage across terminals 77, 77' drops accordingly activating comparator 68.

Figure 4:
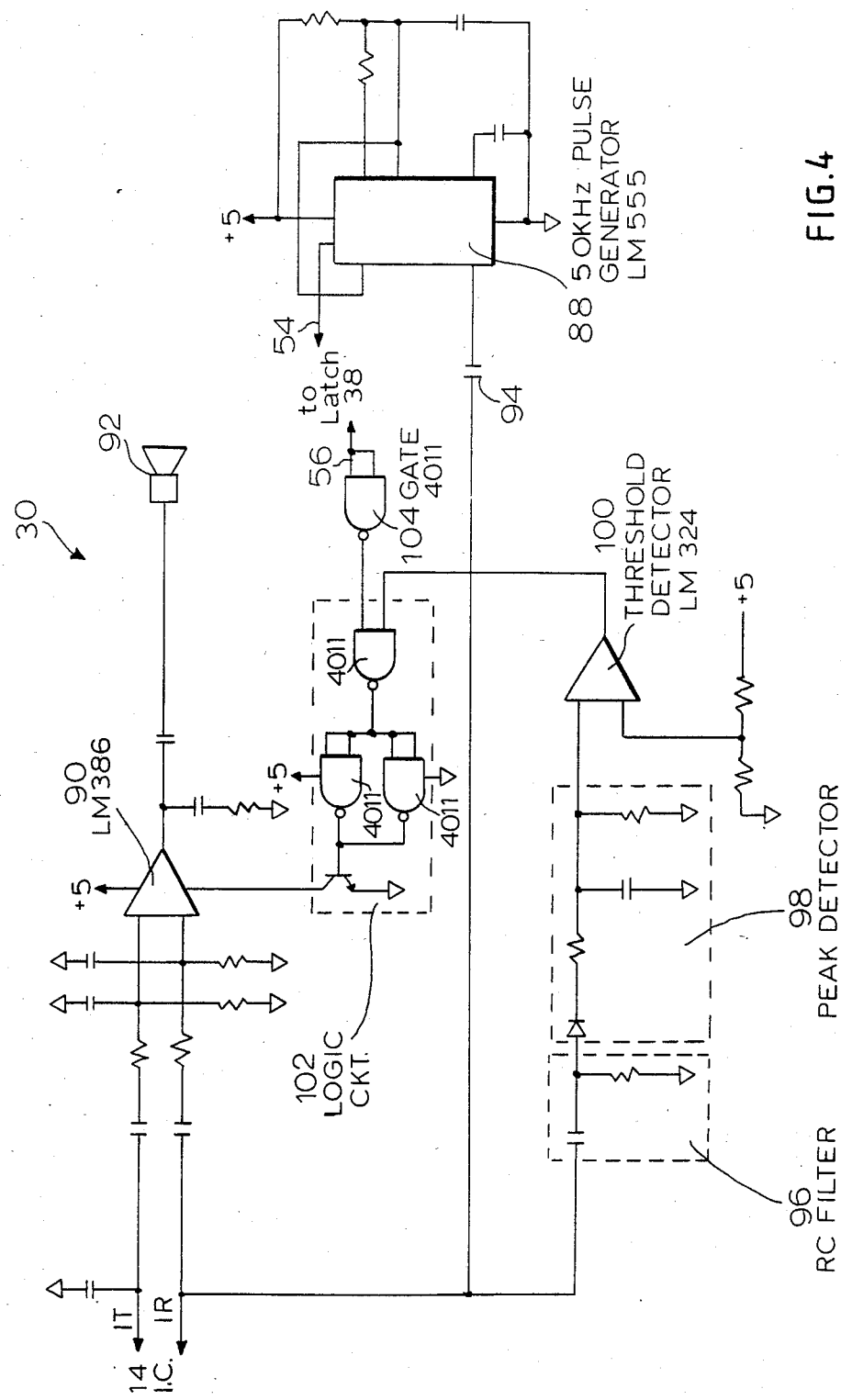
FIG. 4 shows the circuits used to implement paging.

A preferred embodiment of the intercom signaling or paging circuit is shown on FIG. 4. The circuit comprises a 50 KHz tone generator 88, a paging amplifier 90 and a paging speaker 92.

The intercom paging command received on output 54 from the latch 38 activates a tone generator 88. The tone generator produces a 50 KHz tone which is transmitted over the intercom lines. The 50 KHz tone is far above the speech band and therefore does not interfere with the audio signals. The 50 KHz tone is coupled by capacitor 94 to the intercom line 14.

At the other subsets a first order high pass RC filter 96 with a 40 KHz cut-off, a peak rectifier detector 98, and a threshold detector 100 decode the paging tone. The output of the threshold detector 100 drives logic circuit 102 which enables or disables page amplifier 90. The audio amplifier 90 is capacitor-coupled to the intercom line and it drives 2"-8 ohm paging speaker 92.

The paging amplifier is disabled by an appropriate signal received by gate 104 on line 56 from latch 38. The signal on line 56 is generated in any subset that is both OFF HOOK and connected to the intercom line. Thus the paging speaker of any subset that is OFF HOOK and connected to the intercom line is automatically turned off.

Paging can be accomplished by holding the intercom push button down on a subset while speaking into the handset microphone.

Figure 5:
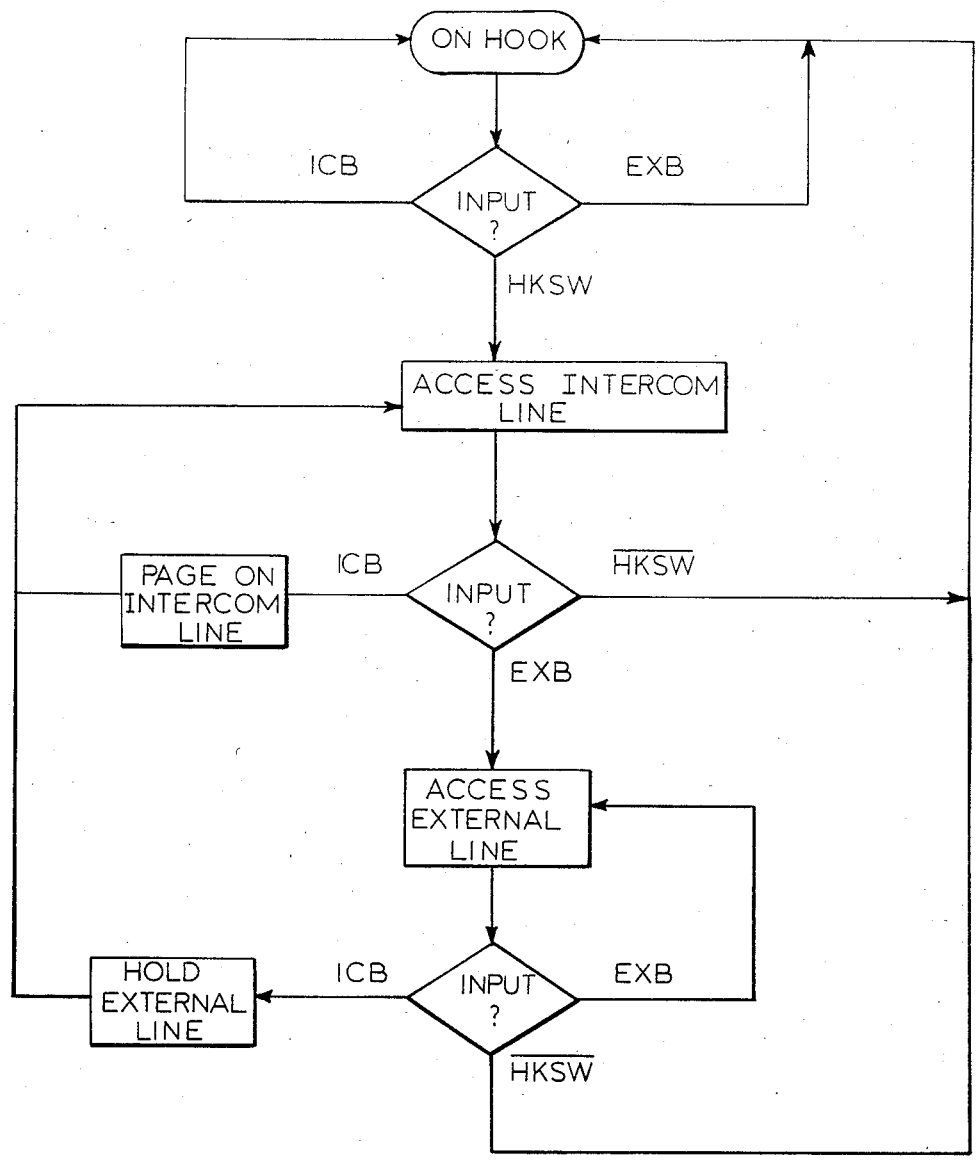
FIG. 5 shows a flow chart for the control system.

The sequencer 40 is initially programmed to provide the appropriate output signals in response to the input signals. The flow chart describing the operation of the sequencer is shown in FIG. 5. Implicitly this flow chart summarizes the operation of the whole system.

As long as the handset 34 of a given subset remains ON HOOK, the subset is in "stand by" mode regardless of the position of push buttons 46 and 48. When the handset is lifted the HKSW signal causes the sequencer to connect the subset to the intercom line 14. Next the sequencer scans its inputs from the hookswitch, the intercom button 48 ("I") and outside button 46 ("O"). If the handset is replaced on the hookswitch the sequencer causes the subset to return to its standby mode. If the "I" input is activated the sequencer enables the paging tone generator 88, thus causing a 50 KHz paging control signal to be impressed on the intercom line 14. This control signal enables the paging amplifiers of the other subsets so that any paging audio messages generated from the handset are amplified to the paging speakers of the other subsets. As previously mentioned, the paging amplifier of the set originating the paging control signal and any sets that are OFF HOOK and on intercom are disabled.

At this point if the handset of a second subset is picked up said second subset is immediately connected to the intercom line, its paging speaker is disabled and a person on the second subset may communicate with a person at the first subset. The second subset, the first subset, or both may access the outside line by activating the outside pushbutton 46 ("O").

Once a subset is in its outside mode, activating its intercom pushbutton automatically puts the outside line on hold.

Replacing the handset on the hookswitch returns the set and the sequencer to its "standby" mode, during which the subset is connected to the central office line 12. It should be pointed out that relay 62 is wired so that the lines L1, L2, and therefore the subset, are connected to the central office line 12 when the relay is de-energized. This insures that a power failure, or a malfunction of the power supply does not block access to the outside line.

Obviously numerous modification may be made to the preferred embodiment without departing from the scope of the invention as defined in the appended claims.

Figure 6A:
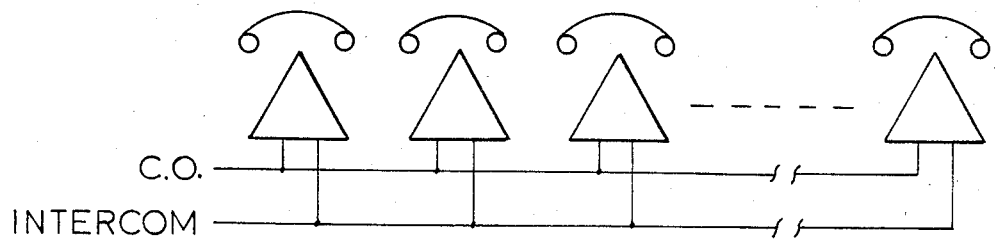
FIGS. 6a, b and c show different configurations of the system.
Figure 6B:
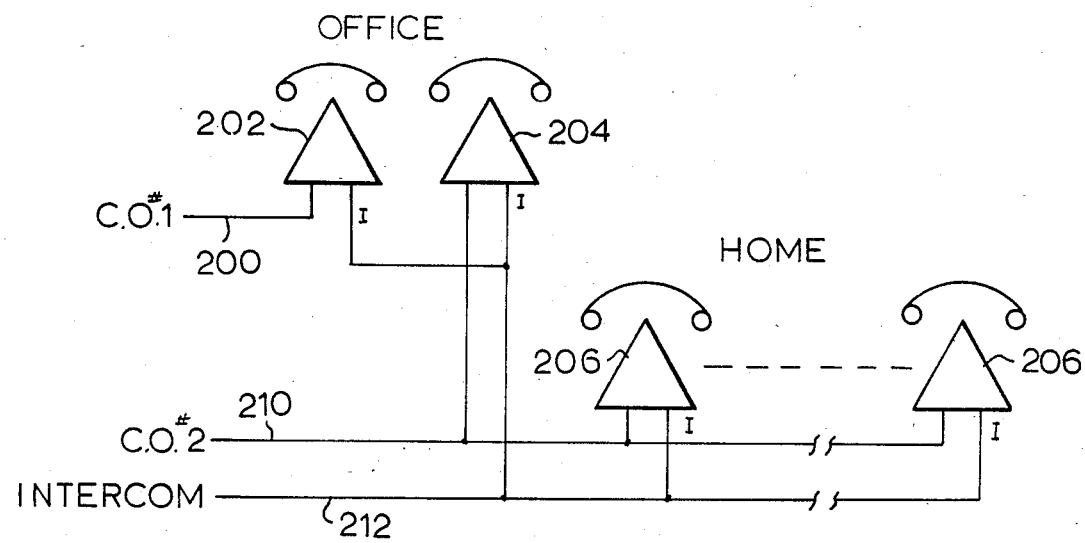

For example, as shown in FIG. 6a all the subsets could be connected to a single quad line. This system configuration is ideal in a private home. The configuration of FIG. 6b is suited for a person having a business office in his home. A first C.O. line 200 is connected to a first subset 202 in the office while a second C.O. line 210 is connected to a second subset 204 in the office as well as to subsets 206 in the home. A common intercom line 212 is run between all the subsets.

Figure 6C:
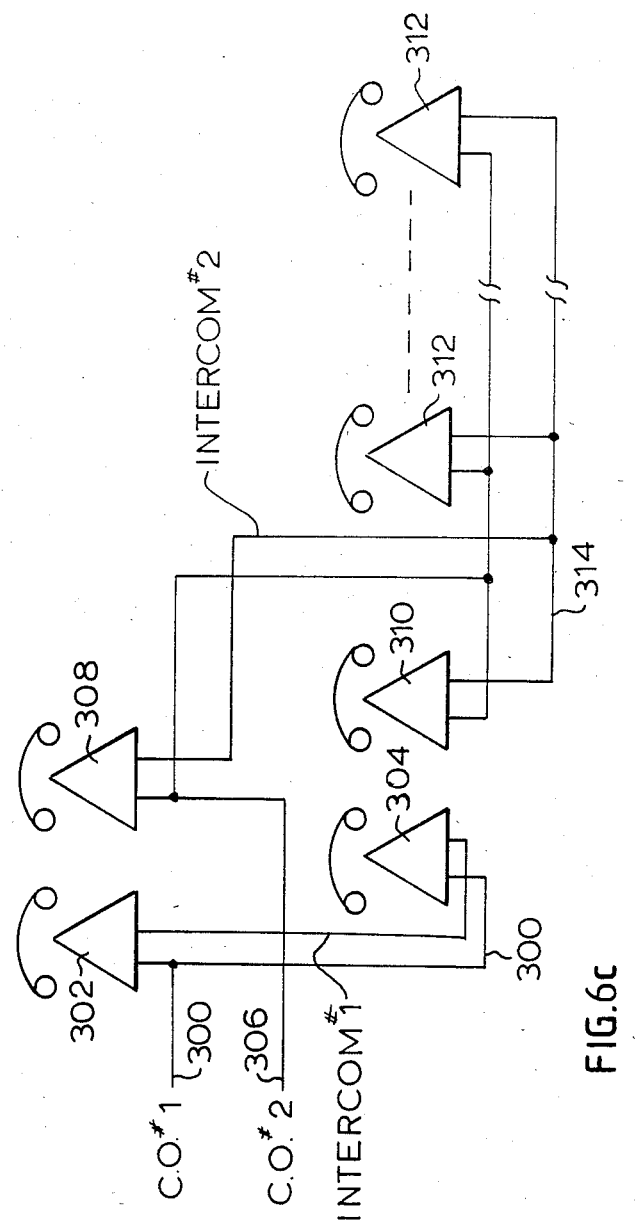

The configuration of FIG. 6c can be used in a relatively small business. A first C.O. line 300 is connected to a first subset 302 in the manager's office and a second subset 304 disposed in the secretary's office. A second C.O. line 306 is connected to a subset 308 in the manager's office, a subset 310 in the secretary's office, and various other subsets 312 distributed through the plant. A common intercom line 314 is connected to all the subsets except for one subset each for the manager 302 and secretary 304 which are connected to a separate intercom line.

Furthermore the invention could be easily practiced by adding an adjunct box, containing the above-described components, in series with the lines to a typical prior art subset. Preferably complete subsets could be provided in which the invention has been built in.

It is obvious that the above systems could comprise some regular subsets, i.e. subsets in which the components described in FIGS. 3 and 4 are missing. Except for the hold, paging and intercom functions these standard subsets would be fully compatible with the systems.

For relatively small systems, a single AC supply 18 and DC feed circuit 76 is sufficient. The DC power in such systems is transmitted over the intercom pair 14.

All the other subsets would need only a 24 VDC to 5 VDC converter. For larger systems each subset is provided with its own AC supply and DC feed circuit.

One skilled in the art could make numerous modifications to the invention without departing from its scope as defined in the appended claims.

We claim:

1. A telephone intercommunication system comprising:
    a plurality of telephone subsets;
    a first line operatively connected to said subsets for further connection to a telephone line;
    a second line operatively connected to said subsets for providing a communication path between the subsets;
    means, within each said subset, for transmitting audio frequency paging signals over said second line and means for receiving said paging signals;
    means, within each said subset, for generating a paging control signal having a frequency range outside the audio frequency range for activating said means for receiving paging signals, said paging control signals being transmitted via said second line;
    means, within each said subset, for selectively holding said first line; and
    control means, associated with and self-contained in each said subset for selectively accessing said subset to one of said first and second lines and for generating and receiving control signals; said control means including a first selective push-button means, a second selective push-button means, accessing means for selectively accessing said first and second lines, and a sequencer means for controlling said accessing means, said means for generating a paging control signal, said means for receiving audio signals and said holding means.

2. The system of claim 1 further comprising at least one standard subset which does not have self-contained control means.

3. The system of claim 1 wherein each subset further comprises holding means selectively activated by the control means, for holding said first line after it has been accessed by the subset, said holding means being automatically released when any subset accesses the first line.

4. The system of claim 1 wherein each subset further comprises indicating means operatively connected to said lines to indicate the presence of activity on said lines.

5. The system of claim 1 wherein the transmitting means comprises a handset for generating said signals.

6. The system of claim 1 wherein said means for receiving paging signals comprises means for amplifying and reproducing said paging signals.

7. The system of claim 1 wherein the means for receiving paging signals, of any subset which accesses the intercom line, is disabled by said sequencer means.

8. The system of claim 1 wherein the second line is used to send and receive said control signals.

9. The system of claim 1 wherein said control means is adapted to automatically access the second line when the subset goes OFF HOOK.

10. The system of claim 1 wherein the control means selectively generates a paging control signal for activating said means for receiving paging signals.

11. The system of claim 10 wherein the paging control signal is transmitted on the second line.

12. A telephone subset, comprising:
    first connecting means for connecting said subset to a first line;
    seond connecting means for connecting said subset to a second line;
    a handset for receiving audio signals from one of said first and second lines and for generating audio signals for one of said first and second lines and for generating audio frequency signals for transmission on one of said first and second lines;
    a hookswitch associated with said handset;
    control means for selectively accessing said handset to said first and second lines and for generating and receiving control signals; and
    a first push-button means for signalling said control means to access said first line, and a second push-button means for signalling said control means to access said second line.

13. The subset of claim 12 further comprising: dialing means for generating dialing signals; and ringing means which is activated when a ringing signal is received on said first line.

14. The subset of claim 12 wherein said control means comprises a sequencer, and a switch means, said sequencer receiving input signals from said hookswitch, and first and second push button means, and in response thereto generating output signals for operating said switch means.

15. The subset of claims 14 wherein said control means further comprises latching mean for latching said sequencer input and output signals.

16. The subset of claim 12 further comprising holding means for connection to said first line, said holding means being selectively activated by said control means for selectively holding the first line after it has been accessed by the handset.

17. The subset of claim 12 further comprising means operatively connected to said first and second lines for indicating presence of activity on said lines.

18. The subset of claim 12 wherein the control means selectively generates a paging control signal for transmission on said second line and receiving paging control signal from said second line, said subset further comprising means for receiving paging signals, said means being activated by said paging control signals.

19. The subset of claim 18 further comprising means for disabling said means for receiving paging signals when said paging signals are generated by said subset.

20. The subset of claim 19 further comprising means for disabling said means for receiving paging signals when said subset accesses said second line.

21. The subset of claim 18 wherein said means for receiving paging signal comprises paging signal amplifying means and paging signal reproducing means.

22. The subset of claim 12 wherein said handset is adapted to generate audio frequency paging signals for transmission on said second line.

* * * * *